United States Patent [19]

Messner

[11] 4,245,372
[45] Jan. 20, 1981

[54] APPARATUS FOR PROCESSING OF POULTRY

[75] Inventor: Charles R. Messner, Fayetteville, Ark.

[73] Assignee: Campbell Soup Company, Camden, N.J.

[21] Appl. No.: 5,349

[22] Filed: Jan. 22, 1979

[51] Int. Cl.³ .............................................. A22C 21/00
[52] U.S. Cl. ............................................. 17/11; 17/12
[58] Field of Search ..................................... 17/11, 12

[56] References Cited

U.S. PATENT DOCUMENTS

| 3,213,488 | 10/1965 | Volpe | 17/11 |
| 3,744,087 | 7/1973 | Vertegaal | 17/11 |

FOREIGN PATENT DOCUMENTS 6708529 9/1967 Netherlands ............................... 17/11

*Primary Examiner*—Willie G. Abercrombie
*Attorney, Agent, or Firm*—Paul & Paul

[57] ABSTRACT

A device is provided for severing tails of poultry from their bodies having an infeed guide pivotally mounted with a support member, the infeed guide comprising a one piece unit which has opposed guide members having a slotted opening for receipt of the tail and a counterbalance integral with the one piece unit both of which operate to catch and receive the tail of the bird and correctly guide same into a cutter. The infeed guide and counterbalance unit additionally cooperate with an adjustable stabilizer bar which forks over the slotted opening, is secured to the backside of each of the opposed guide members, and operates to toe the opposed guide members inwardly or outwardly. The infeed guide, counterbalance, and stabilizer bar are all pivotally supported by a common support member and therefore pivot cooperatively relative to each other. The tail is presented to a cutter blade operating in conjunction with a shear block which is secured to the infeed guide and positioned to stably hold the tail for cutting. Shower head sprayers are positioned in a manner to maintain cleanliness and maximum efficiency for the cutting unit.

When this device is utilized in automated poultry processing equipment, poultry is conveyed in conventional eviscerating shackles. These eviscerating shackles cooperate with a back up bar which rides against the eviscerating shackles and aids in delivery of the tail to the lead-in slot of the infeed guide.

16 Claims, 5 Drawing Figures

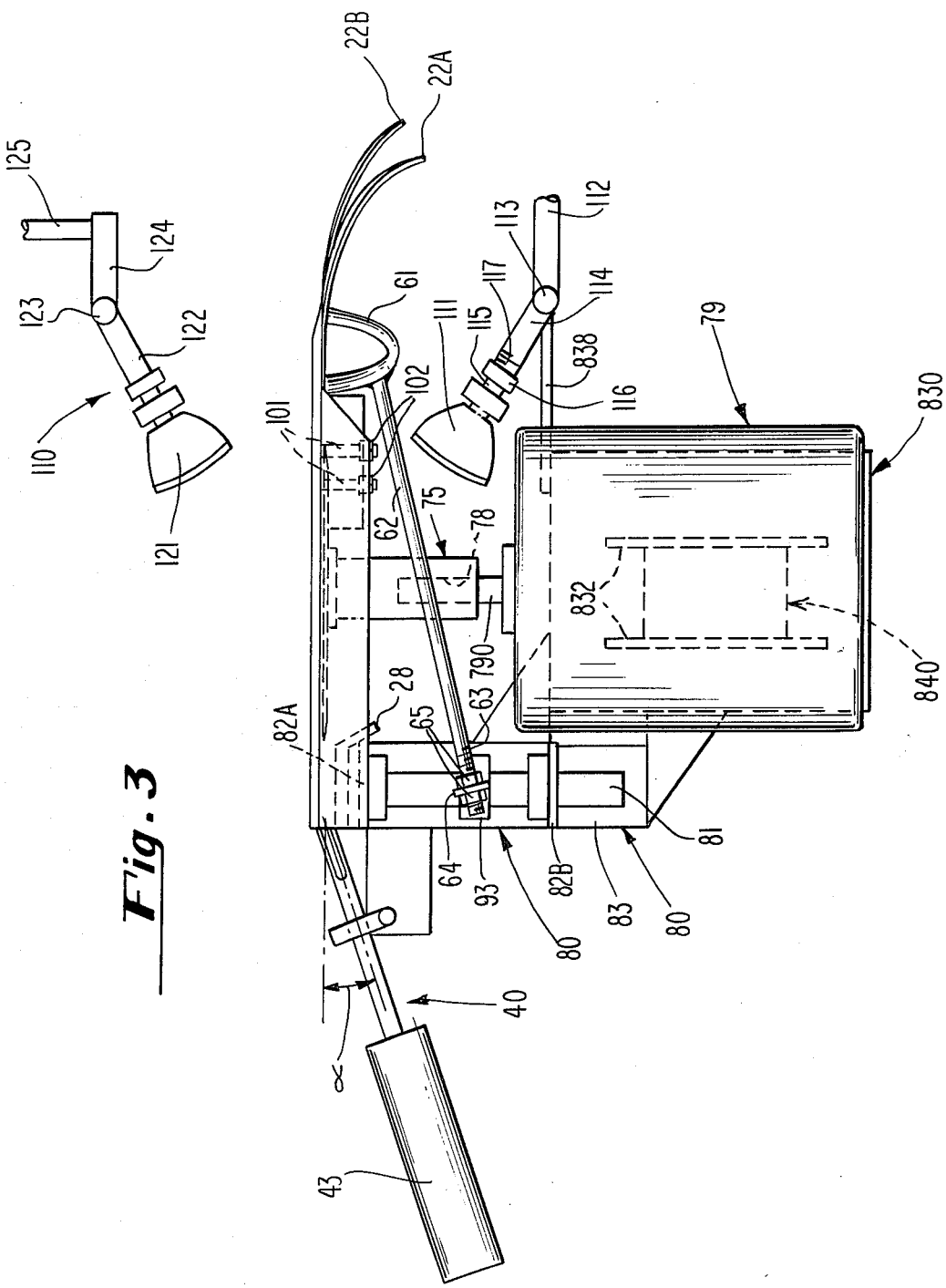

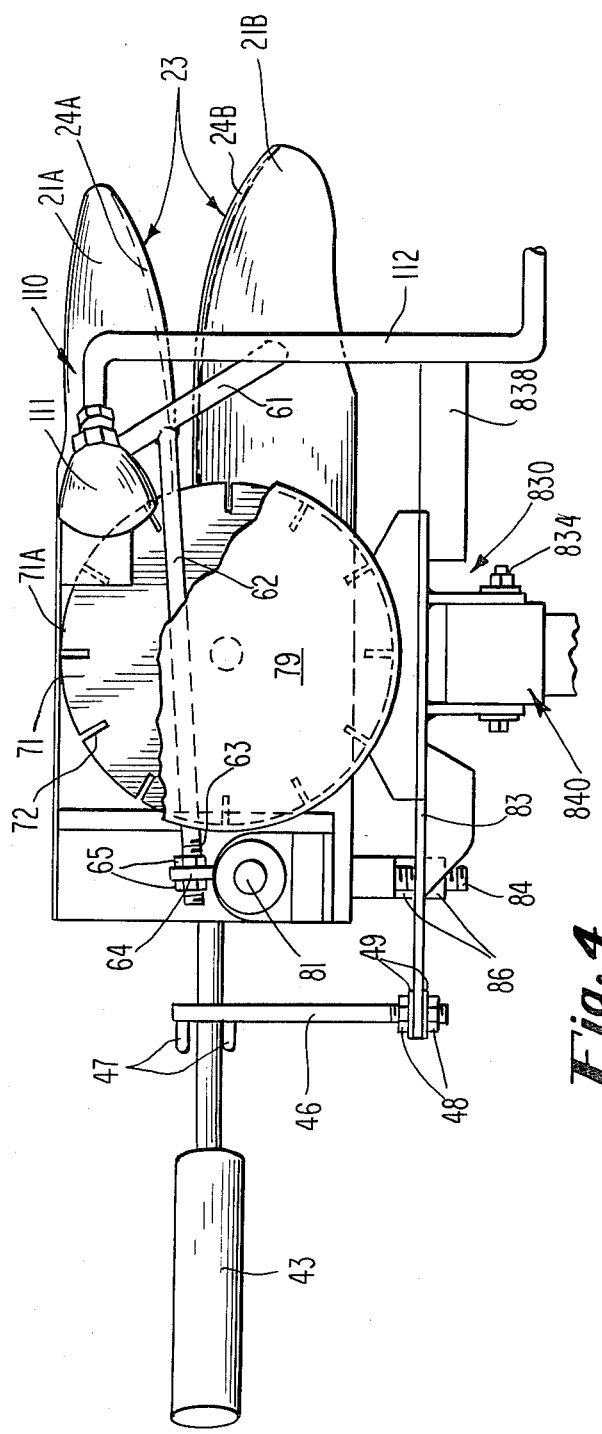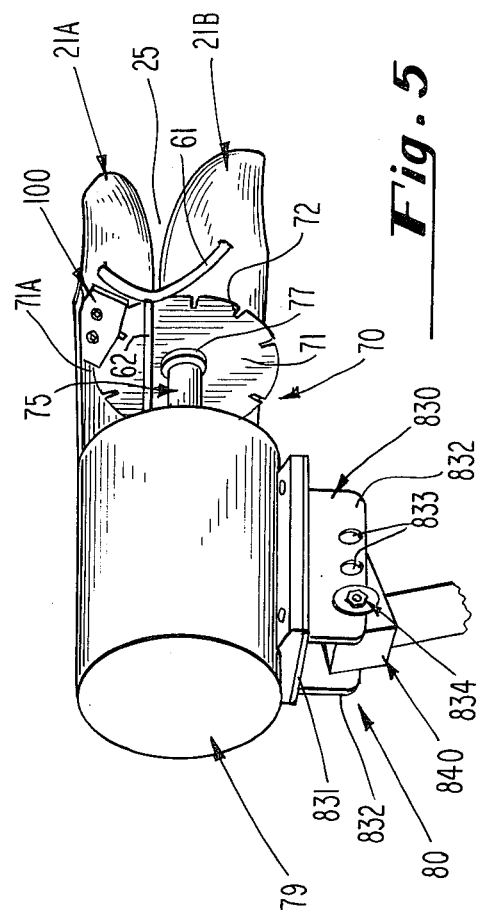

APPARATUS FOR PROCESSING OF POULTRY

BACKGROUND OF THE INVENTION a. Field of the Present Invention

The present invention relates to new and useful improvements in apparatus for removing tail portions of poultry from the remaining carcass and more particularly to apparatus which will accomplish these ends in an accurate and clean manner in eviscerating lines after the poultry has gone through a final wash process.

b. Prior Art Statement

In large scale commercial chicken processing applications, where it is desired to produce quality products, manual cutting of a chicken is undesirable because of the excessive labor costs, and apparatus which accurately and properly cuts chicken into its component parts without fragmenting or splitting the bones is necessary. U.S. Pat. No. 3,943,600 which is assigned to Campbell Soup Company is directed to apparatus and methods for producing a quality product in the environment of a large scale commercial processing operation. While the invention therein disclosed solved many of the problems in the careful removal of wings, thighs, and breasts of poultry without cutting or splitting the bones and without employing considerable manual labor, it has been found that manual labor in dressing a chicken and removing the oil sack to expedite sectioning the chicken may be eliminated be severing the tail from the carcass of the bird in a manner which removes the oil sack.

Prior to the present invention, removal of the oil sack and entrails, was accomplished manually, and more recently, such manual operations were drastically reduced but were still necessary in an operation where a transverse cut between the tail and the anus of the body of the bird was accomplished by automated cutting means as in, for example, U.S. Pat. No. 3,744,087. This patent provides for an automated method of making such a cut on the body of a chicken regardless of its variations in size, however, the cut is utilized only to permit the manual removal of the intestines of the bird and only to serve as a starting cut for manually cutting the skin of the bird.

Certain other prior art patents illustrate conventional shackle arrangements for conveying poultry into infeed guides, however, they relate to severing the heads and neck of the birds, see for example, U.S. Pat. Nos. 3,056,161 and 3,277,518. These patents are not directed to the problems encountered in interacting with shackled poultry to grasp and receive the tail end portions of variously sized poultry for their severance from the carcass.

It is therefore an object of the present invention to provide a device for severing the tails, and particularly the oil sack found in such tails, from the remaining carcass of the poultry in an automated and efficient manner, which eliminates manual labor generally utilized in such processing.

It is another object of the present invention to provide a device which operates in conjunction with shackle conveyed poultry of various sizes and weights to seek out and receive tails of variously sized poultry guiding same into a cutter such that the cut is, within certain limits, made at the correct location on the body, regardless of variations in size.

A further object of the present invention is to provide a compact and rugged unit which is easily repaired and may be utilized to automatically remove chicken tails from birds on either right handed or left handed eviscerating lines.

A further object of the present invention is to provide novel apparatus which includes a novel mechanical feeding mechanism to properly position the carcass and feed it into the cutting blade.

A still further object of the present invention is to provide a novel infeed construction which is laterally adjustable and which automatically pivots to seek out and capture the tail to be cut, thereafter guiding same properly into the cutting blade for severance of the tail whereupon the device again pivots back to its original position in readiness to capture and guide the next advancing tail of the shackled poultry.

Still yet a further object of the present invention is to meet the USDA requirements which mandate that no cutting debris enter into the poultry cavity and therefore the present invention provides a system of fluid showers which maintains the carcass of the bird debrisless while at the same time increases the efficiency of the cutting operation by maintaining a clean cutting blade and cutting area.

A still further object of the present invention is to provide novel apparatus having the features and characteristics as set forth above which is of relatively simplified construction, is easy to maintain, adjust and clean, and is entirely efficient and effective in operation and use.

SUMMARY OF THE INVENTION

These objects are attained by the present invention wherein an infeed guide is made as a one-piece unit which is slotted, curved and beveled and operates in combination with an adjustable counterbalance, all of which is pivotally mounted upon a pivot shaft. The slotted one-piece construction forms two opposed guide members which through utilization of a stabilizer bar, welded to an arch support which is secured to each of the two opposed guide members on the backside of the infeed guide, provide rigid toe-in and toe-out adjustment. The support is arched to allow tail passage down the infeed slot. The infeed guide pivots vertically to seek proper tail cutting positions, regardless of the weight range of the birds, the size of which may vary in length as much as 2 inches.

Both the stabilizer bar and the counterbalance are directed away from the chicken line to provide adequate clearance for the birds.

The infeed guide is further designed and provided with a lateral folded edge which folds over the cutting blade to keep water flush confined to the cutting area and to provide added strength to the unit. The bottom edge of one of the opposed guide members is provided with a forward bend running horizontally to supply rigidity to the unit.

This unit is especially useful in operation in conjunction with standard eviscerating lines of poultry processing equipment in which the chicken is delivered to such unit by conveyors which suspend the poultry head down and tail toward the unit. One feature of the present invention utilizes a back up bar riding against the eviscerating shackles, the bar being positioned to aid in the delivery of the tail into the lead in slot of the infeed guide. Moreover, one of the two opposed guide members is made narrow to aid in proper shackle clearance while the other portion is made wider to provide protection for the body and wings of the moving bird. The infeed guide slot is preferably beveled to offer less resistance as the tail passes therethrough.

Furthermore, the pivot rod connected to the infeed unit is maintained in an adjustable pivot rod support which provides for lateral (in and out) adjustment of the infeed guide which is further supported on a tilt adjustment mechanism fastened to the main frame to permit uniform adjustment of the unit laterally and axially of the shackled poultry.

The shower head sprayers are positioned in a manner which maintains cleanliness and maximum efficiency of the cutting unit as well as to meet USDA standards.

Other objects of the present invention and the various features and details of its operation and construction will be evident to one skilled in the art upon reference to the following description of the drawing figures, the detailed description of the preferred embodiment of the present invention, and the appended claims.

DESCRIPTION OF THE DRAWING FIGURES

FIG. 3, is a top plan view of the present invention.

FIG. 4, is a side elevation of the backside of the present invention as illustrated in FIG. 3.

FIG. 5, is a view in perspective of the backside of the infeed guide means of the present invention, further illustrating the cutting mechanism and its interaction with the infeed guide.

DETAILED DESCRIPTION OF THE PREFERRED EMBODIMENT

Figure 1:
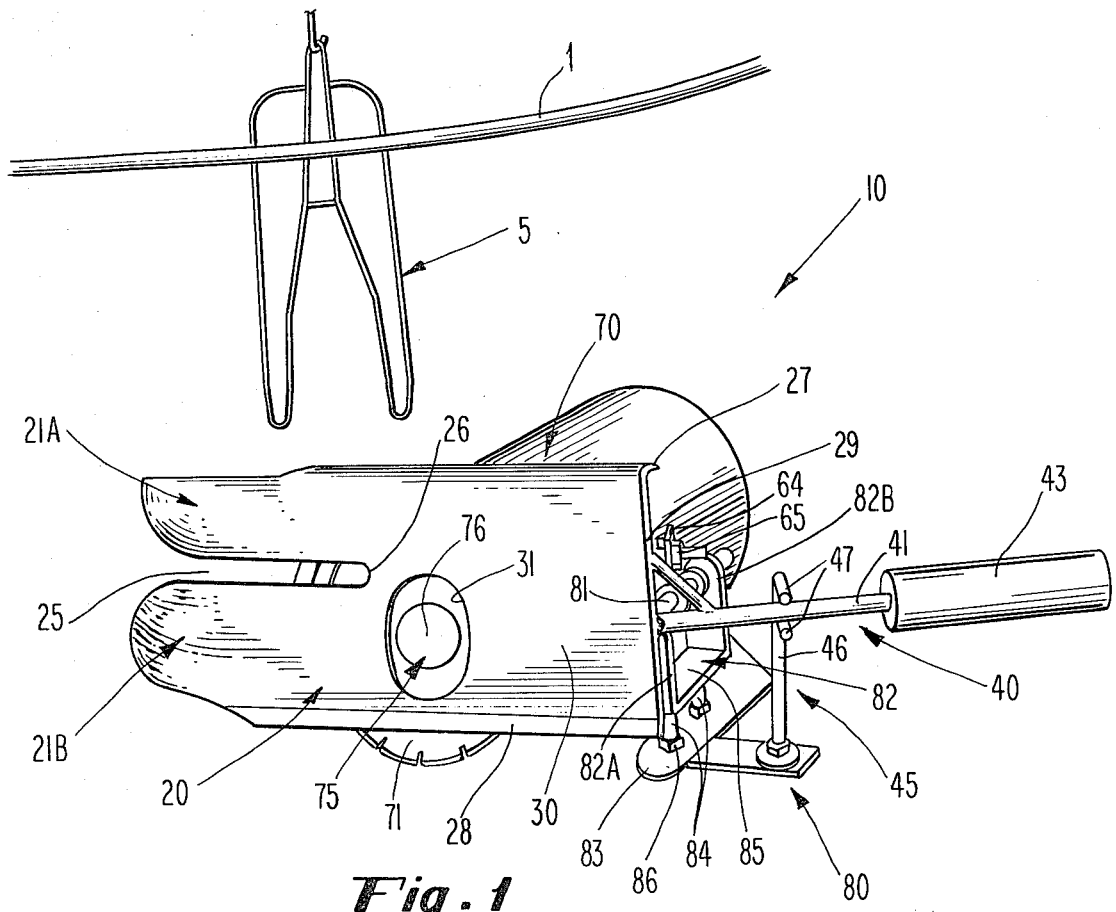
FIG. 1, is a view in perspective of the front of the device of the present invention operating together with a back up bar in an eviscerating line in an automated poultry processing system.

Poultry to be processed by the apparatus disclosed herein comprise whole carcasses which have been subjected to a final wash process and are delivered to the infeed end of the apparatus by conventional poultry conveyors which support the poultry in a hanging position. In operation, the carcasses are initially suspended in conventional eviscerating shackles 5, head down and tail toward apparatus 10. Poultry as thusly suspended is conveyed by conventional poultry conveyors (not shown) and are delivered to apparatus 10 with the aid of back up bar 1 riding against eviscerating shackle 5 to deliver the tail to lead in slot 25 of infeed guide 20.

It will be understood that apparatus 10 may be used in automated poultry processing equipment in cooperation with conventional poultry conveyors, with back-up bars 1 in the eviscerating lines of such processing systems. It will also be understood that there are right handed and left handed eviscerating lines and likewise there may be right handed and left handed devices 10. While the detailed description of the preferred embodiment of apparatus 10 will only be described with respect to left handed eviscerating lines and apparatus 10, the description of the various elements of same will be the mirror image of a right handed apparatus placed in a right handed eviscerating line.

Figure 2:
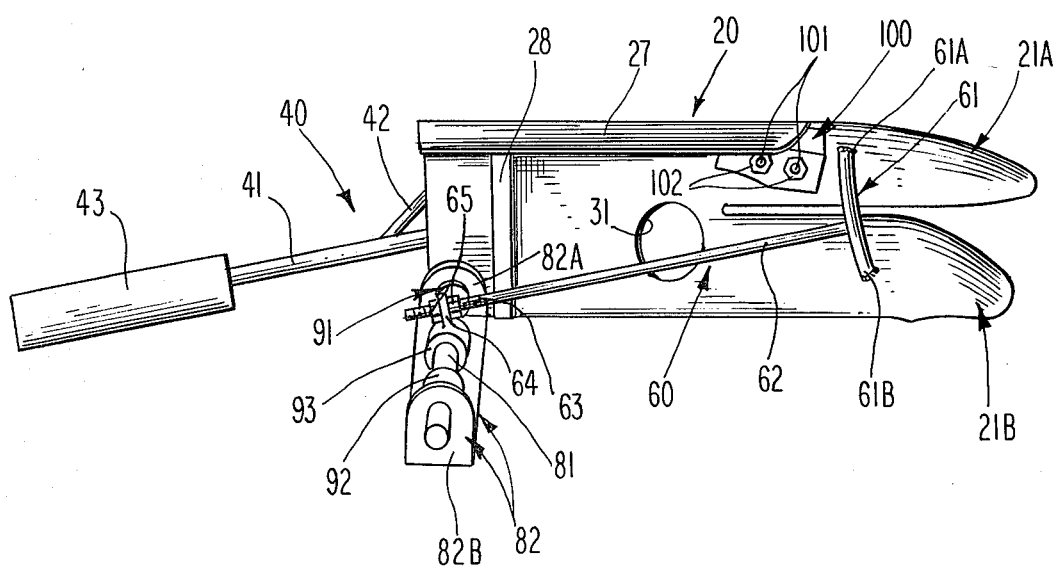
FIG. 2, is a view in perspective of the backside of the device of FIG. 1 illustrating the infeed guide of the present invention, without showing the cutting mechanism.

Referring now to FIGS. 1 and 2, tail cutting device 10 comprises infeed guide member 20, counterbalance system 40, stabilizer system 60 and cutting system 70.

FIGS. 1, 3 and 5 illustrate various components of support system 80 upon which the above elements are mounted and secured and additionally, to which spray system 100 is likewise secured, see FIGS. 3 and 4.

Infeed guide member 20 is made as a single unit and fabricated of a one piece stainless steel sheet forming an upper guide member 21A and a lower guide member 21B which constitute opposed guide members having slotted opening 25 therebetween. As is best seen in FIG. 3, opposed guide members 21A and 21B have tips 22A and 22B which are curved inwardly, away from the eviscerating line and shackle 5. The uppermost guide member 21A is curved more severly relative to that of the lowermost guide 21B and together, form a gradually reducing, curved opening, of approximately 4 inches at tips 22A and 22B, thereafter reducing to approximately one-half inch slotted opening 25 (see FIG. 1). Tip 22A and front portion of infeed guide member 21A are relatively narrow in width to aid in proper shackle clearance while tip 22B and lower front portion of infeed guide member 21B are made wider to amply protect the body and wings of the moving bird as its tail is presented to cutting blade 71. As is best shown in FIG. 4, opposed edges 23, forming slotted opening 25, contain beveled edges 24A and 24B of opposed guide members 21A and 21B, respectively. Opposed guide members 21A and 21B form a first portion of infeed guide means 20 whereupon at the terminating edge 26 of slotted opening 25, opposed guide members 21A and 21B meet, forming second portion 30, which is of a rigid nature containing an ellipitical opening 31 therein, to permit guide member 20 to pivot in relatively close relation with cutter blade 71 without interference of outer portion 76 of spanner 75, as is more fully described hereinbelow. Laterally folded edge 27 is provided on the upper portion of infeed guide member 20, folding over cutter blade 71 to contain water flush from shower head 101 within the cutting areas as is also more fully described hereinbelow. Additionally, lateral folded edge 27 provides added strength to the infeed guide member 20. Forward bend 28 is provided along the bottom edge of infeed guide member 20, running horizontally of infeed guide member 20 to supply additional rigidity to the unit.

Referring now to FIGS. 1 through 4, it can be seen that counterbalance system 40 comprises main bar 41 welded to back edge 29 of infeed guide member 20 and is further supported by strut 42, which is likewise welded to edge 29 and to bar 41 to further aid in supporting bar 41 and weight 43. The rear side of infeed guide member 20, shown in FIG. 2, is welded in its lower rear end corner to rod 81 which is pivotally mounted within pivot rod support 82 which is in turn supported by main frame 83 by two threaded rods 84 each welded to base 85 of pivot rod support 82 with each passing through main frame 83 and each being adjustably secured thereto by two pairs of nuts 86 to effectively tilt pivot rod support 82 and in turn tilt rod 81 and infeed guide member 20 (FIGS. 1 and 4). This adjustment permits raising and lowering of infeed guide members 20 relative to the shackled birds. Main frame 83 also supports limit system 45 of counterbalance system 40, main frame 83 being bored for receipt of limit rod 46 which has limit forks 47 welded thereto relatively perpendicular thereof. Limit rod 46 is threaded (not shown) so that it may be adjustably secured with main frame 83 by a pair of nuts 48 and washers 49. Forks 47 of limit rod 46 are arranged to lie above and below counterbalance bar 41 to limit the vertical travel of bar 41, counterbalance system 40, and infeed guide member 20 as it pivots on rod 81 about pivot rod support 82. As is best shown in FIG. 3, counterbalance system 40 is directed away from the eviscerating line as defined by the plane of second portion 30 of infeed guide member 20 at angle α, to permit adequate clearance of the detailed birds.

In operation of device 10 as thus far described, the poultry, which is transported head down and tail toward infeed guide member 20 is transported by eviscerating shackle 5 along a conventional poultry conveying system (not shown) until the poultry approaches tips 22A and 22B of infeed guide member 20. Thereafter, shackle 5, which rides against back up bar 1, cooperates therewith and is forced thereby to swing upwardly (into the plane of the drawing of FIG. 1) moving the body of the bird inwardly relative to the plane as defined by infeed guide member 20, resulting in the tail of the bird moving upwardly and interacting with tip 22A and/or 22B of infeed guide member 20. Thus, the tail is captured and directed into slotted opening 25 along beveled portions 24A and 24B. Infeed guide member 20 operates in conjunction with counterbalance 40 to capture the tails of variously sized birds and through the interaction of rearwardly curved opposed guide members 21A and 21B, as are best shown in FIG. 3, directs and correctly positions the tails of variously sized birds for proper alignment with and removal by cutting system 70, to consistently, within certain limits, remove the oil sack and related unedible tail portions from the birds. Device 10, permits the optimum control for cutting variously sized birds or bird lots by utilizing a pivotally mounted infeed guide member 20 which is laterally adjustable. Rod 81 which is welded to infeed guide member 20, may be moved inwardly or outwardly within pivot rod support 81. The optimum lateral position of infeed guide member 20 is then fixed through use of collars 91 and 92. Collars 91 and 92 are fittedly bored for mounting with rod 81 and have set screws (not shown) for securing collars 91 and 92 in stationary position with rod 81. The position of infeed guide member 20 is fixed by abutting collar 91 with shoulder 82A and collar 92 with shoulder 82B of pivot rod support 82 and securing collars 91 and 92 with rod 81 utilizing the set screws (see FIGS. 2 and 3).

Moreover, the pivotal movement of the infeed opposed guide members 21A and 21B is adjustably controlled by adjusting pivot limit system 45 as hereinabove described.

Furthermore, opposed guide members 21A and 21B can be toed inwardly and outwardly by stabilizer system 60 which firmly and stably supports opposed guide members 21A and 21B with respect to cutting blade 71. Stabilizer system 60 is fabricated of an arch support 61 having two end portions 61A and 61B each welded to opposed guide members 21A and 21B, respectively, with the arch functioning to permit unobstructed passage of the tails of the birds through slotted opening 25 in opposed guide members 21A and 21B as they are directed to cutting blade 71. Bar 62 is welded at one end to arch support 61 and has threads 63 at the other end passing through a bored portion (not shown) of member 64. Member 64 is welded to a pin (not shown) which swivels in third collar 93 fabricated similarly to collars 91 and 92, above. Bar 62 is adjustably secured with collar 93 by being held securely within member 64 by a pair of nuts 65 which engage threads 63. As thus far described, stabilizer system 60 effectively positions opposed guide members 21A and 21B by virtue of its axial and lateral adjustments. Axial adjustment is accomplished by properly positioning adjusting bar 62 relative to member 64 and then fixing its position by tightening opposed nuts 65 down upon each side of member 64. Member 64 contains an opening (not shown) to accommodate rod 62 and provides surfaces upon which nuts 65 may be turned down upon. Lateral adjustment is accomplished by moving collar 93 inwardly and outwardly along rod 81.

Referring now to FIGS. 1, 3, and 5, it can be seen that cutting system 70 comprises a cutting blade 71 which is a beveled circular blade, the bevel being at the rear side of the blade, namely, the side away from infeed guide member 20 (shown in FIG. 5). Open slots 72 are provided at intervals measured along the outer circumference of blade 71. Blade 71 is supported by spanner 75 secured therein between front head 76 and rear head 77, both of which are disc like and secured one to the other as is known in the art. Spanner 75 also contains therein a bored section 78 and set screws (not shown) which in combination operate to secure spanner 75 with shaft 790 of motor 79.

As is best shown in FIGS. 3 and 5, motor 79 is a totally enclosed electric motor which is bolted to motor support 830 which has a base portion 831 and two opposed shoulder portions 832. Shoulder portions 832 contain bored holes 833 for receipt of threaded bolt, washer and nut system 834. The motor support 830 is secured with support member 840 which is welded to and supported by main frame 83. Motor frame bracket 830, as thus far described, is constructed to tilt cutting system 70 to position blade 71 properly with respect to infeed guide member 20 to gain the best advantage in tail presentation to cutter 71. As is best seen in FIG. 1, elliptically bored portion 31 in second portion 30 of infeed guide member 20 permits pivotal movement of infeed guide member 20 without contacting and/or interfering with spanner 75 and therefore cutting system 70.

Referring now to FIGS. 2, 3, and 5, a nylon shear block 100 is provided and is secured with the back portion of infeed guide member 20 by bolts 101 which are welded to back portion of infeed guide 20 and are threaded. Nylon shear block 100 has two bored portions (not shown) for receipt of bolts 101 upon which nylon shear block 100 is secured by nuts 102 as is best shown in FIGS. 2 and 5. Lateral folded edge 27 folds over cutting blade 71 and shear block 100. Shear block 100 holds the tail of the bird in a semistable position for cutting.

Referring now to FIG. 3, fluid medium system 110 comprises fluid heads 111 and 121. Fluid shower head 111 is in fluid connection with fluid supply 112 connected to a supply of water and to shower head 111 through pivotally adjustable member 113 which is in fluid connection with conduit 114 is in fluid connection with member 115 which telescopes inwardly and outwardly. Member 115 is adjustably secured by threaded assembly 116 which when loosened on threads 117 permits conduit 115 to slide inwardly and outwardly and when turned down upon threads 117 secures conduit 115 in fixed position forming a water tight seal. Conduit 115 is in fluid connection with shower head 111 which has a two-inch diameter face. Fluid supply conduit 112 is secured to support 838 which is welded to motor support 830. Shower head 111 is positioned to direct a fluid spray of water onto cutting blade 71 and shear block 100 to flush same with water and insure cutter blade 71 and shear block 100 are debrisless. Shower head 121 likewise has a two-inch diameter face and is in fluid connection with conduit 122 which is mounted pivotally and in fluid connection with member 123. Member 123 is in turn in fluid connection with conduit 124. Spray head 121 is supported by main frame 80 (not shown), and is in fluid connection with fluid feed 125. Fluid feed 125 is connected to a source of water. Shower head 121 is positioned to direct a fluid stream of water toward the front side or poultry side of infeed guide member 20 directed through slotted opening 25 in which the tail rides to insure that any water entering the bird is clean. It is to be understood that various fluid medium may equally be used to accomplish the ends of the present invention; for example, air, saline solutions, and the like.

In operation of device 10 as thus far described, cutting blade 71 is driven by motor 79 with upper edge 71A travelling in the direction of the bird on the conveyor (counterclockwise as viewed in FIG. 5). Blade 71 cooperates with counterbalanced infeed guide 20 to force the tail somewhat upwardly where nylon shear block operates to hold the tail in semi-stable position to further aid in its severance from the poultry carcass. Lateral edge 27 helps to contain the spray from shower head 111 and the water flying from blade 71 within the area defined by the extremities of infeed guide member 20 and with the help of splash shield 28 (FIGS. 2 and 3), which is welded to the back portion of infeed guide member 20. Additionally, small sprays (not shown) may be directed to flush lateral folded edge 27 and forward bend 28.

From the foregoing it will be observed that the present invention provides a novel apparatus for severing tails of poultry from their carcasses.

While a particular embodiment of the present invention has been illustrated and described herein, it is not intended to limit the invention to such a disclosure, and changes and modifications may be incorporated and embodied herein as would be obvious to one skilled in the art, all within the scope of the present invention.

What is claimed is:

1. In poultry processing equipment for the automated severance of tails of birds from the bodies thereof, the birds being suspended on eviscerating shackles and conveyed to a cutter, the improvement which comprises:
   a. a support member;
   b. an infeed guide pivotally mounted with said support member including first means for capturing and directing said tail to said cutter and second means in operative engagement with said first means for pivotally counterbalancing said first means to repeatedly position same to receive said tails of variously sized birds and for operating together with said first means to present said tails to said cutter for their removal.

2. In poultry processing equipment as in claim 1, the improvement which further comprises an eviscerating shackle guide bar means suspended proximately with said eviscerating shackles and said cutter, said eviscerating shackles being conveyed such that they communicate with said guide bar means, for forcibly delivering said tail to said first means of said infeed guide.

3. In poultry processing equipment as in claims 1 or 2, wherein said first means includes a pair of opposed guide members forming a slotted opening into which said tails are delivered and through which they are guided into said cutter.

4. In poultry processing equipment as in claim 3, wherein said second means includes an adjustable counterbalance bar integral with said first means and which pivots therewith, and an adjustable pivot limit integral with said frame and positioned to limit said pivotal movement of said counterbalance bar, thereby limiting said pivotal movement of said opposed guide members.

5. In poultry processing equipment as in claim 3, wherein said frame means further includes a rod pivotally contained within said frame means and secured with said infeed guide means, said poultry processing equipment further including stabilizer means being secured at one portion to each of said opposed guide members and at the other adjustably with said rod for supporting each of said opposed guide members, maintaining same out of contact with said cutter, and permitting lateral and axial adjustment of said opposed guide members for toeing same inwardly and outwardly.

6. In poultry processing equipment as in claim 5, wherein said frame means further includes a frame, an adjustable pivot rod support integral with said frame, said rod pivotally contained within said pivot rod support and secured with said infeed guide means, and means for securing said infeed guide means in fixed position with respect to said pivot rod support while permitting said infeed guide means to pivot with said rod about said pivot rod support.

7. In poultry processing equipment as in claim 6, wherein said stabilizer means further includes a stabilizer bar, a collar adjustably secured with said stabilizer bar and adjustably mounted with said rod, and an arched support secured to each of said opposed guide members and integral with said stabilizer bar.

8. In poultry processing equipment as in claim 3, wherein said infeed guide means includes a front portion along which said bodies of said birds are conveyed as their tails are presented through said opening in said opposed guide members to said cutting means and a back portion, said cutter positioned at said back portion of said infeed guide means in close relation with said opposed guide members such that a portion of said cutter lies parallel to and along said opening, wherein said poultry processing equipment further comprises shearing means secured to said back portion of one of said opposed guide members for holding said tails in semi-stable position to insure their complete severance from said bodies as they are conveyed into said cutter.

9. In poultry processing equipment as in claim 8, further comprising first fluid means for directing a fluid medium from said front portion of said infeed guide means through said slotted opening wherein said tails ride, to insure that said bodies of said birds are clean and free of debris created by engagement of said cutter with said tails.

10. In poultry processing equipment as in claim 9, further comprising second fluid means for directing a fluid medium onto said cutter for removing said debris from this area.

11. A device for cutting poultry which severs tails of shackled birds from their bodies comprising:
   a. frame means for supporting said device;
   b. cutting means supported by said frame means for severing said tails from said bodies of said poultry and
   c. infeed guide means pivotally mounted with said frame means for rasing and lowering said infeed guide means relative to shackled birds for repeatedly capturing and directing said tails into said cutter means for removal of said tails.

12. A device for cutting poultry which severs tails of birds from their bodies comprising:
   a. frame means for supporting said device;
   b. cutting means supported by said frame means for severing said tails from said bodies of said poultry; and
   c. infeed guide means pivotally mounted with said frame means for repeatedly capturing and directing said tails into said cutter means, wherein said infeed guide means further includes counterbalance means integral with said infeed guide means for pivoting said infeed guide means to ensure repeated capture of said tails by said infeed guide means and cooperating therewith for presentation of said tails to said cutter means.

13. A device for cutting poultry which severs tails of birds from their bodies comprising:
   a. frame means for supporting said device, wherein said frame means further includes a frame, an adjustable pivot rod support integral with said frame, a rod pivotally contained within said pivot rod support and secured with said infeed guide means and means for securing said infeed guide means in fixed position with respect to said pivot rod support while permitting said infeed guide means to pivot with said rod about said pivot rod support;
   b. cutting means supported by said frame means for severing said tails from said bodies of said poultry;
   c. infeed guide means pivotally mounted with said frame means for repeatedly capturing and directing said tails into said cutter means.

14. A device for cutting poultry as in claim 13, wherein said infeed guide means includes a pair of opposed guide members constituting first and second guide members which form an opening into which said tails are delivered and guided into said cutting means said device further including stabilizer means adjustably engaging said rod for affording lateral and axial adjustment to toe-in and toe-out said infeed guide means.

15. A device for cutting poultry as in claim 14, wherein said stabilizer means further includes a stabilizer bar, third means for adjustably securing said stabilizer bar with said rod and an arched support having two ends each secured to each of said opposed guide members said arched support integral with said stabilizer bar.

16. A device for cutting poultry as in claim 15, wherein said infeed guide means includes a front portion along which said bodies of said birds are moved as their tails are presented through said opening in said opposed guide members to said cutter means, and a back portion, said cutter means further including a cutter blade positioned at said back portion of said infeed guide means in close relation with said opposed guide members such that a portion of said cutter blade lies substantially parallel to said infeed guide means and along said slotted opening for severing said tails, said device further including shearing means secured to said back portion of one of said opposed guide members for holding said tails in semi-stable position to ensure their complete severance from said bodies as they are moved into said cutter blade.

* * * * *

UNITED STATES PATENT OFFICE
CERTIFICATE OF CORRECTION

Patent No. 4,245,372　　　　　　　Dated　January 20, 1981

Inventor(s) Charles R. Messner

It is certified that error appears in the above-identified patent and that said Letters Patent are hereby corrected as shown below:

Column 1, Line 29, "be eliminated be" should be
--be eliminated by--.

Column 4, Line 41, "along the bottom edge" should be
--along the bottom most edge--.

Column 5, Line 16, "to swing upwardly" should be
--to swing inwardly--.

Column 6, Line 51, "in a semistable position" should be
--in a semi-stable position--.

Column 6, Line 58, "conduit 114 is in fluid" should be
--conduit 114. Conduit 114 is in fluid--.

Column 8, Line 68, "means for rasing and lowering" should
be --means for raising and lowering--.

Signed and Sealed this

Nineteenth Day of May 1981

[SEAL]

Attest:

RENE D. TEGTMEYER

Attesting Officer　　　Acting Commissioner of Patents and Trademarks